(12) United States Patent
Orbon et al.

(10) Patent No.: US 12,304,625 B2
(45) Date of Patent: May 20, 2025

(54) MULTI-PURPOSE PROP-ROTOR SPINNER ARRANGEMENT

(71) Applicant: Lockheed Martin Corporation, Bethesda, MD (US)

(72) Inventors: James Breen Orbon, New Haven, CT (US); James McCollough, Fort Worth, TX (US); Evan S. Tobin, Newtown, CT (US); Xiaole Xie, Westport, CT (US); Jonathan Frydman, New Haven, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 18/373,172

(22) Filed: Sep. 26, 2023

(65) Prior Publication Data

US 2024/0017824 A1    Jan. 18, 2024

Related U.S. Application Data

(62) Division of application No. 16/933,019, filed on Jul. 20, 2020, now Pat. No. 11,772,784.

(51) Int. Cl.
*B64D 33/08* (2006.01)
*B64C 27/12* (2006.01)
(Continued)

(52) U.S. Cl.
CPC .............. *B64C 27/46* (2013.01); *B64C 27/12* (2013.01); *B64D 13/006* (2013.01); *B64D 33/08* (2013.01); *B64C 2027/8272* (2013.01)

(58) Field of Classification Search
CPC ............. B64C 11/14; B64C 2027/8236; B64C 2230/28; B64D 33/08; B64D 13/006;
(Continued)

(56) References Cited

U.S. PATENT DOCUMENTS 2,401,584 A * 6/1946 Rhines .................... F02M 1/00
                                                    123/41.64
2,436,087 A * 2/1948 Benson .................... F01P 5/02
                                                    416/140
(Continued)

FOREIGN PATENT DOCUMENTS

WO    WO-89/10300 A1    11/1989

OTHER PUBLICATIONS

Final Office Action on U.S. Appl. No. 16/933,019 dated Feb. 16, 2023 (12 pages).
(Continued)

*Primary Examiner* — Richard Green
*Assistant Examiner* — Colin Zohoori
(74) *Attorney, Agent, or Firm* — Foley & Lardner LLP

(57) ABSTRACT

A propeller system for a tail section of an aircraft includes a propeller hub located at the tail section of the aircraft, a plurality of propeller blades mounted to and extending outwardly from the propeller hub, a propeller shaft coupled to the propeller hub and operable to rotate the propeller hub about an axis of rotation, and a propeller gearbox connected to the propeller shaft. The propeller gearbox is fluidly cooled by an airflow within the tail section. A spinner assembly surrounds the propeller hub. The spinner assembly includes at least one outlet opening formed therein downstream from the propeller hub relative to the airflow. The spinner assembly is rotatable to draw the airflow into at least one cooling flow inlet formed in the tail section and across the propeller gearbox to cool the propeller gearbox and out the at least one outlet opening.

9 Claims, 6 Drawing Sheets

(51) Int. Cl.
  *B64C 27/46* (2006.01)
  *B64D 13/00* (2006.01)
  *B64C 27/82* (2006.01)

(58) Field of Classification Search
  CPC ...... B64D 2033/024; B64D 2033/0226; B64D 2033/04; B64D 2033/06; F01D 5/08; F01D 5/081; F01D 5/088; F01D 25/12; F04D 29/5806; F04D 29/582; F04D 29/584; F04D 29/5846; F02C 7/18; F05D 2260/20
  See application file for complete search history.

(56) References Cited

U.S. PATENT DOCUMENTS

| | | | |
|---|---|---|---|
| 2,456,151 A | 12/1948 | Sawyer | |
| 2,586,054 A | 2/1952 | Jonas | |
| 2,719,592 A | 10/1955 | Blanchard, Jr. | |
| 2,755,044 A * | 7/1956 | Gurney | B64D 15/04 60/39.093 |
| 4,930,725 A | 6/1990 | Thompson et al. | |
| 6,336,791 B1 * | 1/2002 | O'Toole | B64C 11/14 416/175 |
| 7,886,544 B2 | 2/2011 | Koenig | |
| 8,689,538 B2 * | 4/2014 | Sankrithi | F01D 7/00 60/226.1 |
| 8,764,381 B2 | 7/2014 | Stern | |
| 11,719,248 B2 * | 8/2023 | Dionne | F04D 25/082 123/41.66 |
| 2011/0056183 A1 * | 3/2011 | Sankrithi | F02K 3/077 60/226.1 |
| 2011/0158808 A1 | 6/2011 | Henze | |
| 2018/0029692 A1 * | 2/2018 | Higbie | B64C 11/14 |
| 2018/0118328 A1 * | 5/2018 | Eilken | F16J 15/02 |
| 2022/0282670 A1 * | 9/2022 | Niergarth | F02K 3/06 |

OTHER PUBLICATIONS

Non-Final Office Action on U.S. Appl. No. 16/933,019 dated Sep. 27, 2022 (9 pages).
Notice of Allowance on U.S. Appl. No. 16/933,019 dated May 31, 2023 (9 pages).

* cited by examiner

MULTI-PURPOSE PROP-ROTOR SPINNER ARRANGEMENT

CROSS-REFERENCE TO RELATED APPLICATIONS

This application is a divisional of U.S. patent application Ser. No. 16/933,019, filed on Jul. 20, 2020, the content of which is incorporated herein by reference in its entirety.

STATEMENT OF FEDERAL SUPPORT

This invention was made with government support under W911W6-19-9-0005, awarded by the United States Army. The government has certain rights in the invention.

BACKGROUND

The subject matter disclosed herein generally relates to a propulsion system of an aircraft. More specifically, the disclosure relates to cooling of gearbox components for a translational thrust system of a rotary wing aircraft.

A rotary wing aircraft with a coaxial contra-rotating rotor system is capable of travelling at higher speeds than a conventional single rotor helicopter due in part to the balance of lift between advancing sides of the main rotor blades on the upper and lower rotor systems. To still further increase airspeed, supplemental translational thrust is provided by a translational thrust system, such as a propeller unit including a propeller oriented substantially horizontal and parallel to the aircraft longitudinal axis to provide thrust for high speed flight.

In such helicopters, the propeller is driven by a propulsor shaft coupled to the helicopter engine along with the coaxial contra-rotating rotor system. The shaft output speed of the engine is particularly high, to enable high speed rotation of the rotor system. However, such high rotational speed is often not necessary or desired for the propeller, so the propeller shaft is commonly coupled to a propeller gearbox for reduction of the propeller rotational speed. Existing propeller gearboxes are typically cooled via a dedicated system, such as an oil cooler for example. However, such cooling systems add both complexity and weight to the translational thrust system.

BRIEF DESCRIPTION

According to an embodiment, a propeller system for a tail section of an aircraft includes a propeller hub located at the tail section of the aircraft, a plurality of propeller blades mounted to and extending outwardly from the propeller hub, a propeller shaft coupled to the propeller hub and operable to rotate the propeller hub about an axis of rotation, and a propeller gearbox connected to the propeller shaft. The propeller gearbox is fluidly cooled by an airflow within the tail section. A spinner assembly surrounds the propeller hub. The spinner assembly includes at least one outlet opening formed therein downstream from the propeller hub relative to the airflow. The spinner assembly is rotatable to draw the airflow into at least one cooling flow inlet formed in the tail section and across the propeller gearbox to cool the propeller gearbox and out the at least one outlet opening.

In addition to one or more of the features described above, or as an alternative, in further embodiments the aircraft includes an airframe and the at least one cooling flow inlet is a fenestration flush with a surface of the airframe.

In addition to one or more of the features described above, or as an alternative, in further embodiments the at least one cooling flow inlet is positioned such that air from a boundary layer of the aircraft is drawn there through via the spinner assembly.

In addition to one or more of the features described above, or as an alternative, in further embodiments the spinner assembly includes a fan, the fan being driven by the propeller shaft.

In addition to one or more of the features described above, or as an alternative, in further embodiments the fan is arranged downstream from the propeller gearbox relative to the airflow.

In addition to one or more of the features described above, or as an alternative, in further embodiments the spinner assembly further comprises: a shaped member having a plurality of blade openings and a bulkhead frame connected to the shaped member.

In addition to one or more of the features described above, or as an alternative, in further embodiments the fan further comprises: a collar mounted to the propeller shaft and a plurality of vanes extending between the collar and an interior surface of the bulkhead frame.

In addition to one or more of the features described above, or as an alternative, in further embodiments the at least one outlet opening is formed in the shaped member of the spinner assembly.

In addition to one or more of the features described above, or as an alternative, in further embodiments the shaped member further comprises: a base having a first end, a central body having a second end, the second end being arranged adjacent the first end, and an annular gap defined between the first end and the second end, the annular gap defining the at least one outlet opening.

In addition to one or more of the features described above, or as an alternative, in further embodiments the first end overlaps with the second end along the axis of rotation.

In addition to one or more of the features described above, or as an alternative, in further embodiments the shaped member further comprises a plurality of fins extending between the base and the central body.

In addition to one or more of the features described above, or as an alternative, in further embodiments the propeller system does not include an oil cooler.

According to another embodiment, a spinner assembly of a propeller system includes a shaped member having a plurality of blade openings, the shaped member being receivable about a shaft; a bulkhead frame connected to the shaped member; at least one opening formed in the shaped member to define an outlet for a fluid flowing within the spinner assembly, and a fan for drawing the fluid into and moving the fluid through the spinner assembly.

In addition to one or more of the features described above, or as an alternative, in further embodiments the fan further comprises: a collar mounted to the propeller system and a plurality of vanes extending between the collar and an interior surface of the bulkhead frame.

In addition to one or more of the features described above, or as an alternative, in further embodiments the shaped member further comprises: a base having a first end, a central body having a second end, the second end being arranged adjacent the first end, and an annular gap defined between the first end and the second end, the annular gap forming the at least one opening.

In addition to one or more of the features described above, or as an alternative, in further embodiments the base and the central body are mounted concentrically and wherein the first end overlaps with the second end along a longitudinal axis of the shaped member.

In addition to one or more of the features described above, or as an alternative, in further embodiments the shaped member further comprises a plurality of fins extending between the base and the central body.

In addition to one or more of the features described above, or as an alternative, in further embodiments the plurality of fins is integrally formed with one of the base and the central body.

In addition to one or more of the features described above, or as an alternative, in further embodiments the base, the central body, and the plurality of fins are integrally formed.

In addition to one or more of the features described above, or as an alternative, in further embodiments the central body is conical and shape and has a generally curved outer surface.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
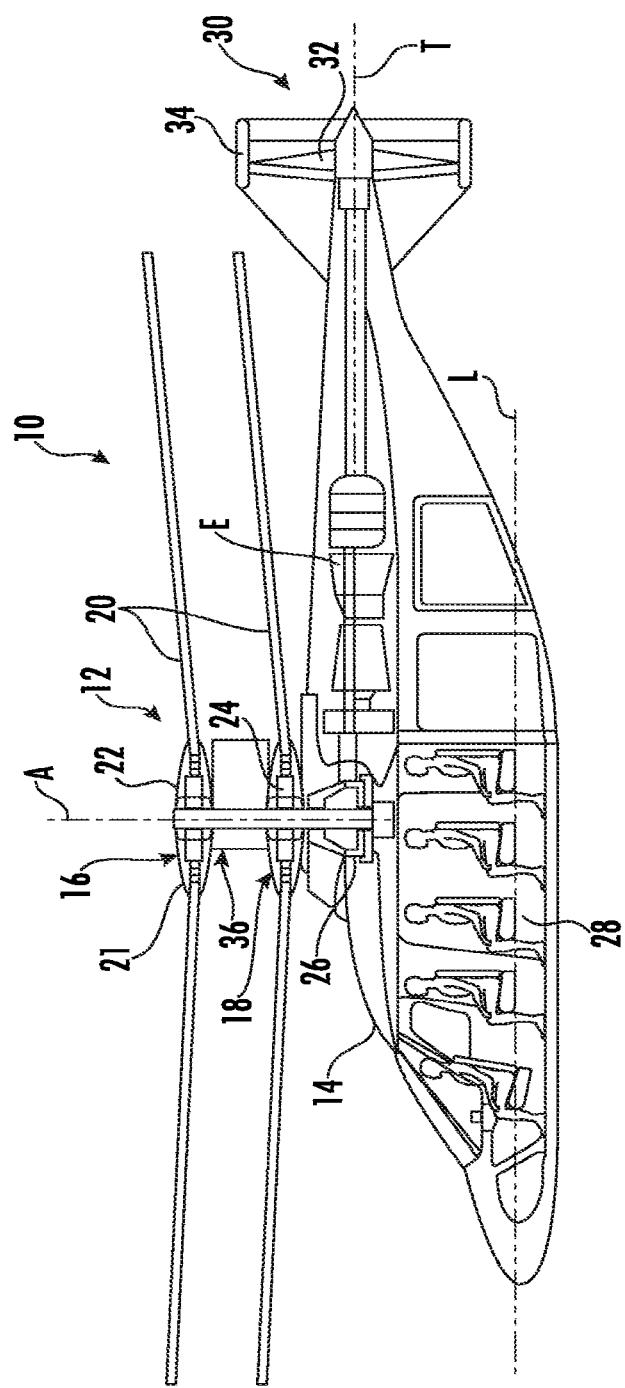
FIG. 1 is a side view of an example of a rotary wing aircraft.

FIG. 1 illustrates and example of a vertical takeoff and landing (VTOL) rotary-wing aircraft 10 having a dual, counter-rotating, coaxial rotor system 12 which rotates about an axis of rotation A. The aircraft 10 includes an airframe 14 which supports the dual, counter rotating, coaxial rotor system 12 as well as an optional translational thrust system 30 which provides translational thrust generally parallel to an aircraft longitudinal axis L. Although a particular aircraft configuration is illustrated in the disclosed embodiment, other translational thrust systems will also benefit from the present disclosure.

The dual, counter-rotating, coaxial rotor system 12 includes an upper rotor system 16 and a lower rotor system 18. Each rotor system 16, 18 includes a plurality of main rotor blades 20 mounted to a rotor hub 22, 24 for rotation about a rotor axis of rotation A. A plurality of the main rotor blades 20 project substantially radially outward from the hub assemblies 22, 24 and are connected thereto in any manner known to one of ordinary skill in the art (schematically illustrated at 21). Any number of main rotor blades 20 may be used with the rotor system 12.

A main gearbox 26 which may be located above the aircraft cabin 28 drives the rotor system 12. The translational thrust system 30 may be driven by the same main gearbox 26 which drives the rotor system 12. The main gearbox 26 is driven by one or more engines (illustrated schematically at E). As shown, the main gearbox 26 may be interposed between the gas turbine engines E, the coaxial rotor system 12 and the translational thrust system 30.

The translational thrust system 30 may be mounted to the rear of the airframe 14 with a rotational axis T oriented substantially horizontal and parallel to the aircraft longitudinal axis L to provide thrust for high-speed flight. Preferably, the translational thrust system 30 includes a pusher propeller.

Figure 2:
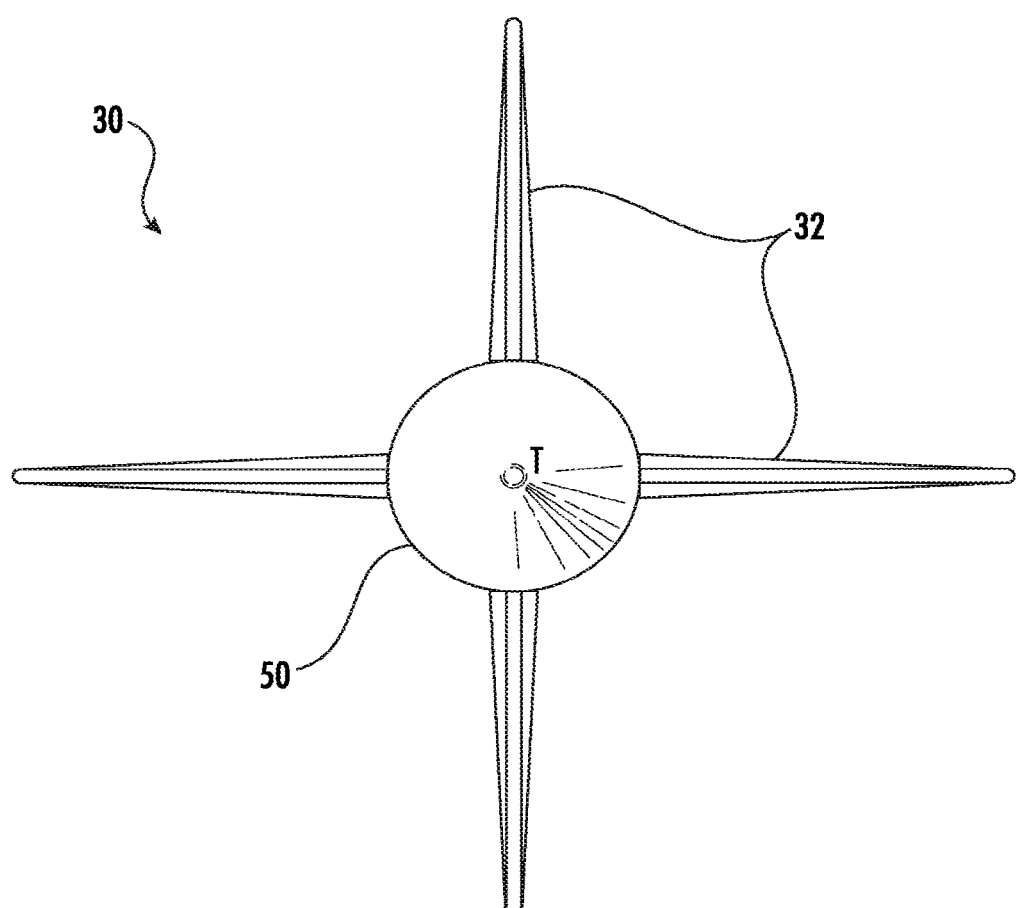
FIG. 2 is an end view of a portion of a translational thrust system of an aircraft.
Figure 3:
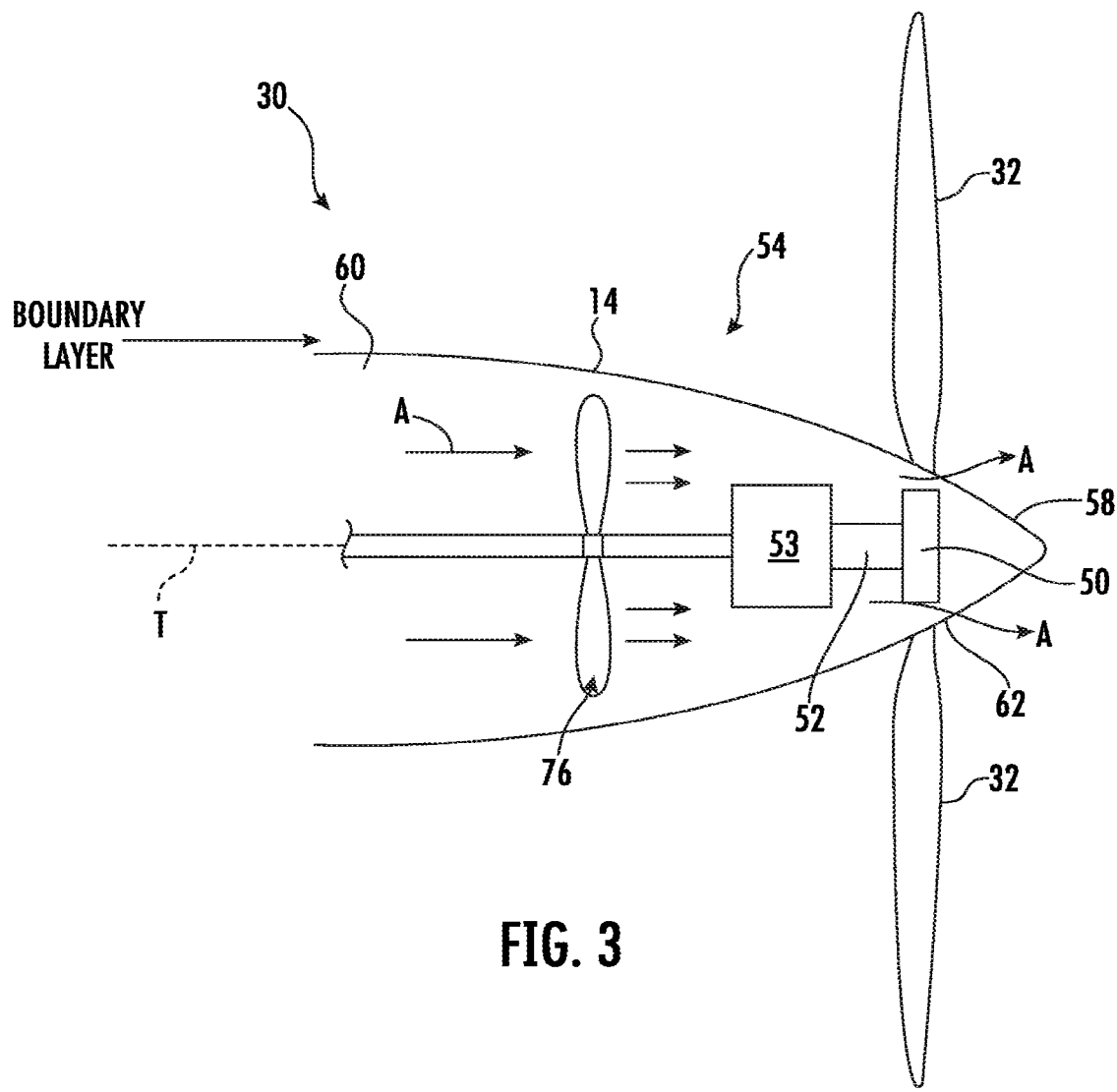
FIG. 3 is a schematic diagram of a translational thrust system including a cooling system according to an embodiment.

With further reference to FIGS. 2 & 3, various views of a portion of the translational thrust system 30 is illustrated in more detail. As shown, the translational thrust system 30 includes a propeller hub 50 mounted to a propeller shaft 52 such that the shaft 52 drives rotation of the propeller hub 50 about an axis of rotation T. Two or more propeller blades 32 are mounted to and extend outwardly from the propeller hub 50. The propeller hub 50 mechanically secures each of the plurality of propeller blades 32 to the shaft 52. A propeller gearbox 53 is connected to the shaft 52 such that the shaft 52 is driven with a desired rotational speed.

A spinner assembly 54 (FIG. 3) encloses the propeller hub 50 and provides an aerodynamic surface around the propeller hub 50. Although the spinner assembly 54 is illustrated and described herein with respect to a translational thrust system 30, such as a propeller of an aircraft, it should be understood that the spinner assembly 54 and the attachment means disclosed herein may be used in any suitable application, such as a fixed wing application and/or a tilt wing application for example.

Figure 4:
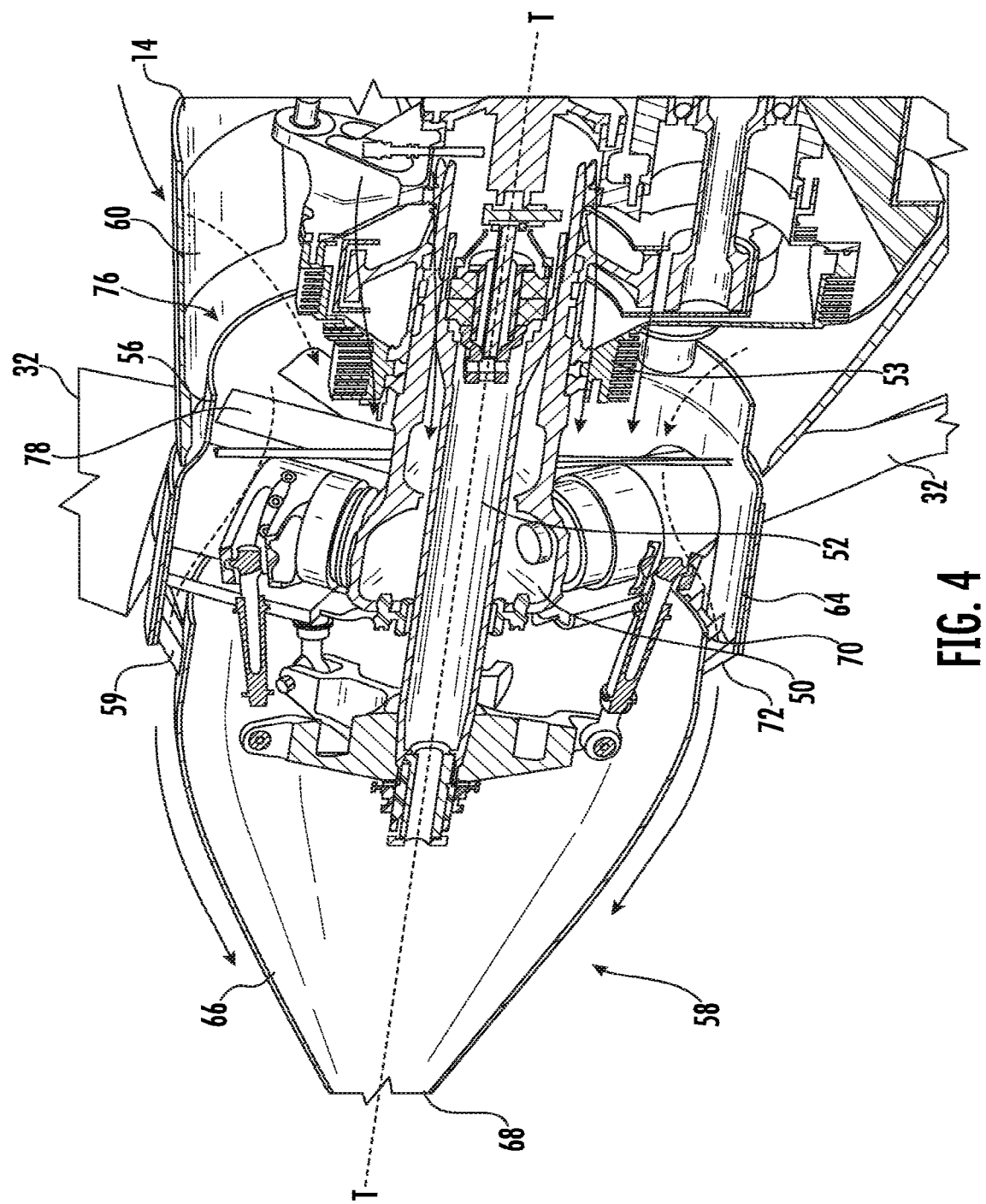
FIG. 4 is a perspective cross-sectional view of a cooling system of a translational thrust system according to an embodiment.
Figure 5:
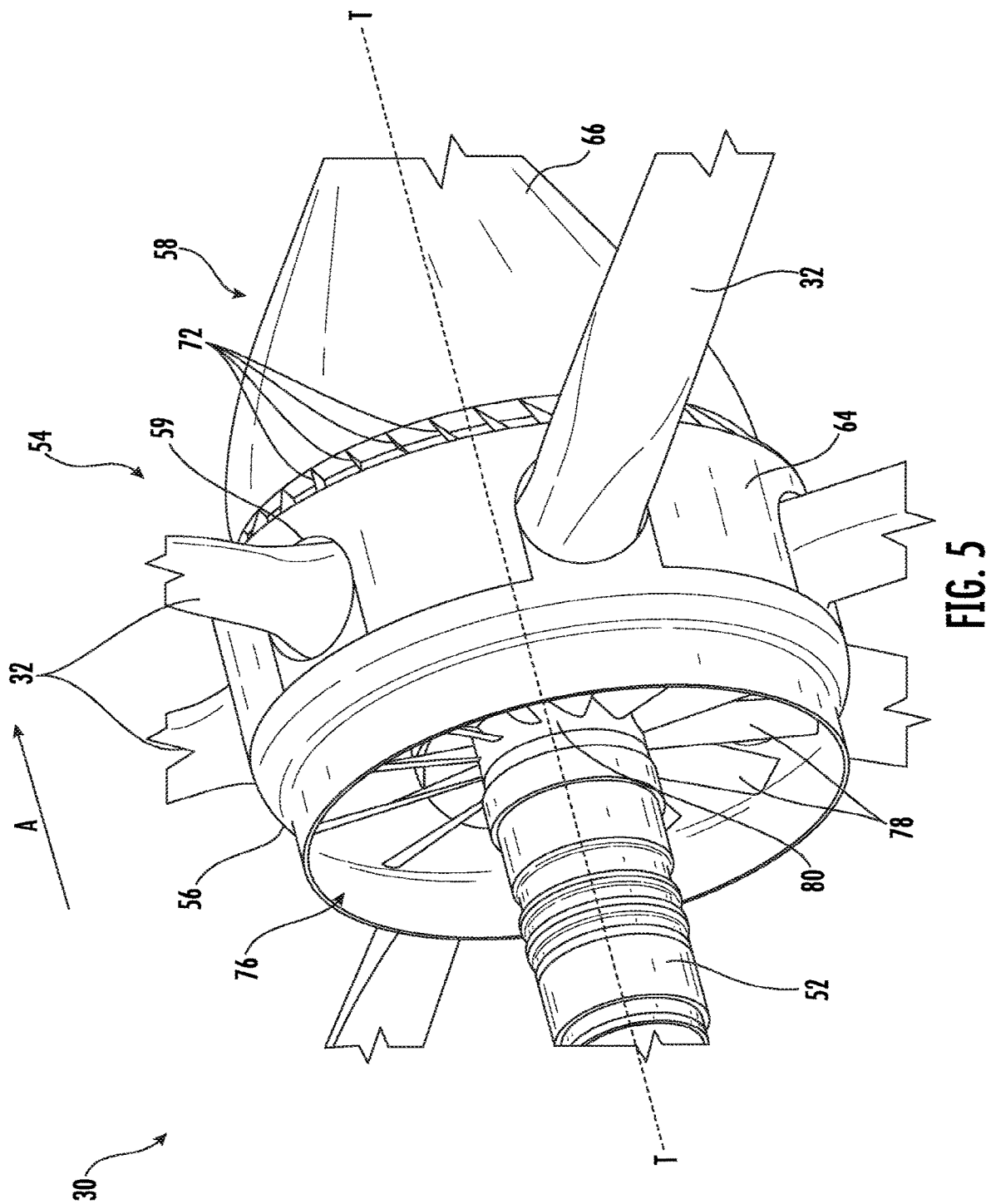
FIG. 5 is a perspective view of a spinner assembly of a translational thrust system according to an embodiment.

As best shown in FIGS. 4 and 5, the spinner assembly 54 includes a generally circular bulkhead frame 56 arranged concentrically with the shaft 52, and a shaped member 58 mounted at a distal end to the bulkhead frame 56 in overlapping arrangement with the propeller hub 50. The shaped member 58 is an aerodynamic fairing or shroud having a plurality of blade openings 59 formed therein such that the shaped member 58 may be installed about an assembled propeller hub 50 and one or more propeller blades 32. The shaped member 58 has a generally curved outer surface configured to provide a smooth, non-turbulent flow of air or another fluid around each propeller blade 32, thereby reducing the drag acting on the translational thrust system 30.

The spinner assembly 54 is connected to the rotating shaft 52 at one or more locations. For example, the spinner assembly 54 may be connected to the shaft 52 at a first location, adjacent a first side of the propeller hub 50. In the illustrated, non-limiting embodiment, the first location is arranged upstream from the propeller hub 50 and is connected to the shaft 52, with respect to the air flow. However, any suitable connection between the spinner assembly 54 and the rotating shaft 52 is within the scope of the disclosure. Although the direction of the air flow is indicated in the illustrated, non-limiting embodiment by arrow A, embodiments where the air flow is arranged in an opposite direction are also contemplated herein.

Referring now to FIGS. 3-6, the propeller gearbox 53 is fluidly cooled to dissipate heat from the components and/or lubricant therein. Unlike existing systems which typically include an oil cooler through which the lubricant is circulated for cooling, the illustrated system does not include such a heat exchanger. Rather, a fluid flow, such as an airflow A for example, passes directly over the propeller gearbox 53 to absorb heat therefrom. In the illustrated, non-limiting embodiment, the airflow A is drawn into the interior of the tail section of the airframe 14, such as from the boundary layer formed adjacent the aircraft 10 for example. As shown, at least one cooling flow inlet 60 formed in the tail section of the airframe 14 is arranged generally upstream from both the propeller gearbox 53 and from the spinner assembly 54 relative to the air flow A. In an embodiment, the inlet 60 may be formed by one or more fenestrations formed in an aft portion or the tail section of the airframe 14. As shown, the cooling flow inlet 60 may be flush with a surface of the airframe 14 and air from a boundary layer adjacent the airframe 14 is drawn there through. However, embodiments where the inlet protrudes from the airframe 14 are also within the scope of the disclosure.

Figure 6:
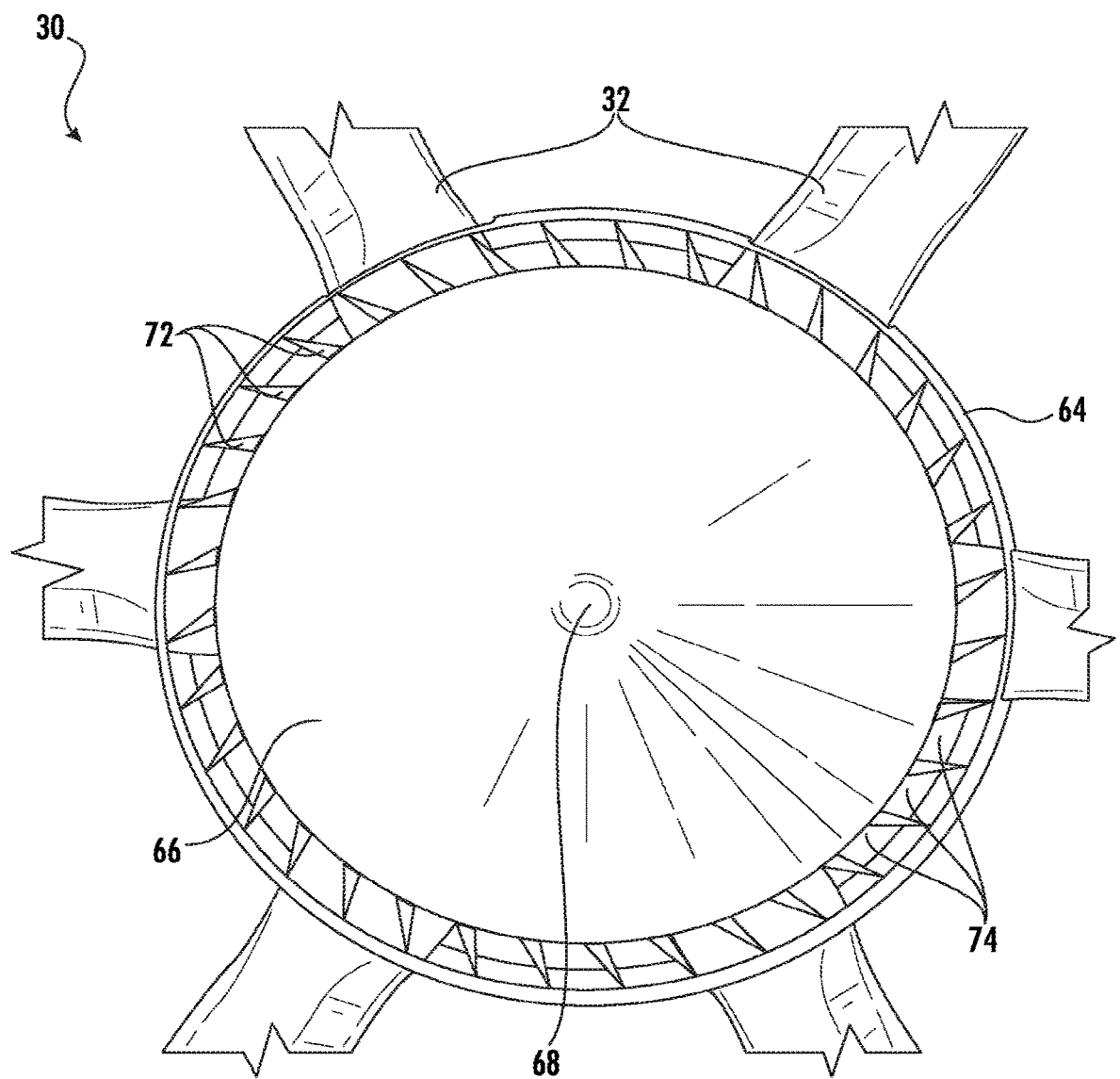
FIG. 6 is an end view of the spinner assembly of FIG. 5 according to an embodiment.

An outlet 62 for exhausting the heated airflow from the tail section is formed in a portion of the spinner assembly 54, such as in the shaped member 58 for example. As best shown in FIGS. 5 and 6, the shaped member 58 includes a base 64 and a central body 66. In the illustrated, non-limiting embodiment, the base 64 is generally circular in shape, and includes the one or more blade openings 59 through which the propeller blades 32 extend. In addition, the central body 66 may include a first end 68 having a first diameter and a second, opposite end 70 having a second diameter. The second diameter is larger than the first diameter, and the sidewalls of the central body 66 may gradually taper between the first end 68 and the second end such that the central body 66 is generally conical in shape. The central body 66 may have a generally curved outer surface configured to provide a smooth, non-turbulent air flow, thereby reducing the drag of the central body 66.

In an embodiment, the second end 70 of the central body 66 is located within the hollow interior defined by the base 64. As a result, the second end 70 of the central body 66 and the base 64 are concentrically mounted relative to the translational thrust axis T, with an annular gap formed there between.

One or more fins 72 extend between the base 64 and the central body 66. In the illustrated, non-limiting embodiment, the spinner assembly 54 includes a plurality of fins 72, such as thirty fins for example. However, it should be understood that embodiments including any number of fins, such as two fins, five fins, ten fins, twenty fins, or more than thirty fins are also within the scope of the disclosure. Each of the fins 72 may have a substantially identical configuration, or alternatively, the configuration of the fins 72 may vary. As best shown in FIG. 6, the fins 72 may be arranged at an angle relative to the translational thrust axis T. However, embodiments where the fins are generally perpendicular to the translational thrust axis T are also contemplated herein. Further, the fins 72 may have a generally linear configuration, or alternatively, may have a non-linear configuration, such as a twist for example, to direct the air flow A exhausted through the outlet 62 in a specific direction, such as away from the propeller for example.

In an embodiment, the plurality of fins 72 may be integrally formed with both the central body 66 and the base 64. Alternatively, the plurality of fins 72 may be integrally formed with one of the central body 66 and the base 64 and connectable to the other of the central body 66 and the base 64, such as via insertion into a plurality of corresponding openings for example. The plurality of fins 72 are spaced about the periphery of the central body 66 and the base 64. Although the fins 72 are shown spaced equidistantly, embodiments where the fins 72 are spaced non-uniformly are also contemplated herein. As a result, an opening 74 is formed between each pair of adjacent fins 72 of the plurality of fins. In combination, these openings 74 define the outlet 62 for the air flow used to cool the propeller gearbox 53. Although the shaped member 58 of the spinner assembly 54 is described as having a multipart construction, it should be understood that embodiments where the spinner assembly or the shaped member of the spinner assembly has a unitary construction are also within the scope of the disclosure.

In an embodiment, best shown in FIG. 5, a fan 76 is arranged upstream from the propeller hub 50 and downstream from the inlet 60 to draw a flow of air through the inlet and across the propeller gearbox 53. In an embodiment, as shown in FIG. 3, the fan 76 may be arranged upstream from the propeller gearbox 53; however, in other embodiments, as shown in FIG. 4, the fan 76 may be located downstream from the propeller gearbox 53. In the illustrated, non-limiting embodiment, the fan 76 is formed integrally with or as a part of the bulkhead frame 56. As shown, a plurality of blades or vanes 78 extend from a collar 80 mounted to the shaft 52 to an interior surface of the bulkhead frame 56. As a result, as the shaft 52 rotates, the bulkhead frame 56 and the vanes 78 connected thereto, will similarly rotate about the axis T, urging a flow of air through the inlet, across the propeller gearbox 53 to transfer heat from the propeller gearbox 53 to the flow of air, and out the outlet 62.

The system for cooling the propeller gearbox 53 illustrated and described herein eliminates the need for additional system components, such as an oil cooler for example, that adds both weight and complexity to the aircraft 10. In addition, by integrating a fan into the spinner assembly 54, the resulting forced convection used to cooling the propeller gearbox 53 occurs whenever the translational thrust system 30 is operational.

What is claimed is:

1. A spinner assembly of a propeller system comprising:
a shaped member having a plurality of blade openings, the shaped member being receivable about a shaft and comprising:
a base having a trailing end; and
a central body having a leading end, wherein the trailing end of the base overlaps the leading end of the central body, wherein the central body is conical in shape;
a bulkhead frame connected to the shaped member;
at least one opening formed in the shaped member to define an outlet for fluid flowing within the spinner assembly; and
a fan for drawing the fluid into and moving the fluid through the spinner assembly, the fan comprising a collar configured to couple to the propeller system and a plurality of vanes coupled at a proximal end to the collar and extending radially from the collar to a distal end coupled to an outer wall of the bulkhead frame, wherein the shaped member at least partially overlaps the outer wall of the bulkhead frame.

2. The spinner assembly of claim 1, wherein the shaped member further comprises:
an annular gap defined between the trailing end of the base and the leading end of the central body, the annular gap forming the at least one opening.

3. The spinner assembly of claim 2, wherein the central body has a generally curved outer surface.

4. The spinner assembly of claim 1, wherein the spinner assembly is configured to rotate about a longitudinal axis of the shaped member, and the fan is offset from the plurality of blade openings in a first direction along the longitudinal axis of the shaped member.

5. The spinner assembly of claim 2, wherein the base and the central body are mounted concentrically.

6. The spinner assembly of claim 2, wherein the shaped member further comprises a plurality of fins extending between the base and the central body.

7. The spinner assembly of claim 6, wherein the plurality of fins is integrally formed with one of the base and the central body.

8. The spinner assembly of claim 6, wherein the base, the central body, and the plurality of fins are integrally formed.

9. The spinner assembly of claim 6, wherein the spinner assembly is configured to rotate about a longitudinal axis of the shaped member, and the plurality of fins are offset from the plurality of blade openings in a second direction along the longitudinal axis.

* * * * *